United States Patent
Xiang et al.

(10) Patent No.: US 9,262,217 B1
(45) Date of Patent: Feb. 16, 2016

(54) COMPUTATION RESOURCE CYCLIC UTILIZATION

(71) Applicant: EMC Corporation, Hopkinton, MA (US)

(72) Inventors: Dong Xiang, Shanghai (CN); Yu Cao, Beijing (CN); Jun Tao, Shanghai, MA (US); Ziye Yang, Shanghai (CN); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 226 days.

(21) Appl. No.: 13/927,341

(22) Filed: Jun. 26, 2013

(51) Int. Cl.
*G06F 9/46* (2006.01)
*G06F 9/50* (2006.01)
*G06F 9/48* (2006.01)

(52) U.S. Cl.
CPC ............... *G06F 9/50* (2013.01); *G06F 9/4887* (2013.01); *G06F 9/5011* (2013.01)

(58) Field of Classification Search
CPC .............................. G06F 9/5011; G06F 9/4887
See application file for complete search history.

(56) References Cited

U.S. PATENT DOCUMENTS

| 7,461,262 B1 * | 12/2008 | O'Toole, Jr. ................. 713/182 |
| 8,275,384 B2 * | 9/2012 | Das et al. ..................... 455/452.1 |
| 2003/0061263 A1 * | 3/2003 | Riddle ................. H04L 12/5695 |
| | | 718/104 |
| 2014/0280979 A1 * | 9/2014 | Battersby et al. ............. 709/226 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Camquy Truong
(74) *Attorney, Agent, or Firm* — Ryan, Mason & Lewis, LLP (57) ABSTRACT

A resource request is sent from a user to a resource controller. The resource controller is resident on a node of a distributed computing platform comprising a plurality of nodes configured to collectively execute at least one application program. A quota pool associated with the resource controller is searched for a matching resource quota for the user to inherit. The resource quota is assigned to the user when a matching resource quota for the user to inherit is found in the quota pool. The resource request is forwarded to a resource scheduler that globally manages resources for the distributed computing platform, when a matching resource quota for the user to inherit is not found in the quota pool.

18 Claims, 7 Drawing Sheets

COMPUTATION RESOURCE CYCLIC UTILIZATION

FIELD

The field relates to information processing, and more particularly to information processing techniques for computation resource cyclic utilization in a distributed computing system.

BACKGROUND

The analysis of massive amounts of data is becoming a routine activity in many commercial and academic organizations. Internet companies, by way of example only, collect large amounts of data such as content produced by web crawlers, service logs and click streams. Analyzing these data sets may require processing tens or hundreds of terabytes of data. Such data sets are known to be referred to as "big data." A data set characterized as big data is prohibitively large such that it is beyond the capabilities of commonly used software tools to manage/process the data, or at least to do so within a reasonable time frame. To perform the analysis tasks, researchers and practitioners have been developing a diverse array of Massively Distributed Computing Platforms (MDCP) running on large clusters of commodity machines (nodes). Examples of such platforms include MapReduce from Google™ and its open-source implementation Hadoop, Dryad from Microsoft™, MPP Database from Greenplum™ and Spark from University of California at Berkley AMPLab.

The node cluster where a MDCP resides represents a limited set of resource elements, such as central processing unit (CPU), memory, disk and network, which fuel the application programs running in the MDCP. Conceptually, a MDCP application includes one or multiple jobs, which in turn are composed of short tasks. Each task is typically executed at a dedicated node. In order to optimize the performance of MDCP applications, the resources of the cluster need to be managed both effectively and efficiently.

SUMMARY

Embodiments of the present invention provide information processing techniques for computation resource cyclic utilization in a distributed computing system.

For example, in one embodiment, a method comprises the following steps. A resource request is sent from a user to a resource controller. The resource controller is resident on a node of a distributed computing platform comprising a plurality of nodes configured to collectively execute at least one application program. A quota pool associated with the resource controller is searched for a matching resource quota for the user to inherit. The resource quota is assigned to the user when a matching resource quota for the user to inherit is found in the quota pool. The resource request is forwarded to a resource scheduler that globally manages resources for the distributed computing platform, when a matching resource quota for the user to inherit is not found in the quota pool. The steps are performed via a processing device.

In another embodiment, a method comprises the following steps. A resource product pool is maintained at a resource scheduler. The resource scheduler is part of a distributed computing platform comprising a plurality of nodes configured to collectively execute at least one application program and the resource scheduler globally manages resources for the distributed computing platform. The resource product pool records resource products belonging to inactive users that can be inherited. A resource product request is received at the resource scheduler from a resource controller. The resource controller is resident on a node of one of the plurality of nodes. The resource product request is sent by the resource controller after a user associated therewith obtains a resource quota but before the user utilizes a given resource to produce a resource product. The resource product pool is searched for a matching resource product for the user to inherit and reuse. The resource product is assigned to the user when a matching resource product for the user to inherit and reuse is found in the resource product pool. The steps are performed via a processing device.

In yet another embodiment, a computer program product is provided which comprises a processor-readable storage medium having encoded therein executable code of one or more software programs. The one or more software programs when executed by the processing device implement steps of one or more of the above-described methods.

In a further embodiment, an apparatus comprises a memory and a processor operatively coupled to the memory and configured to perform steps of one or more of the above-described methods.

Advantageously, resource quota inheritance and resource property inheritance embodiments of the invention, alone or in combination, provide lower latency and better performance of application execution in a distributed computing platform.

These and other features and advantages of the present invention will become more readily apparent from the accompanying drawings and the following detailed description.

DETAILED DESCRIPTION

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Figure 1A:
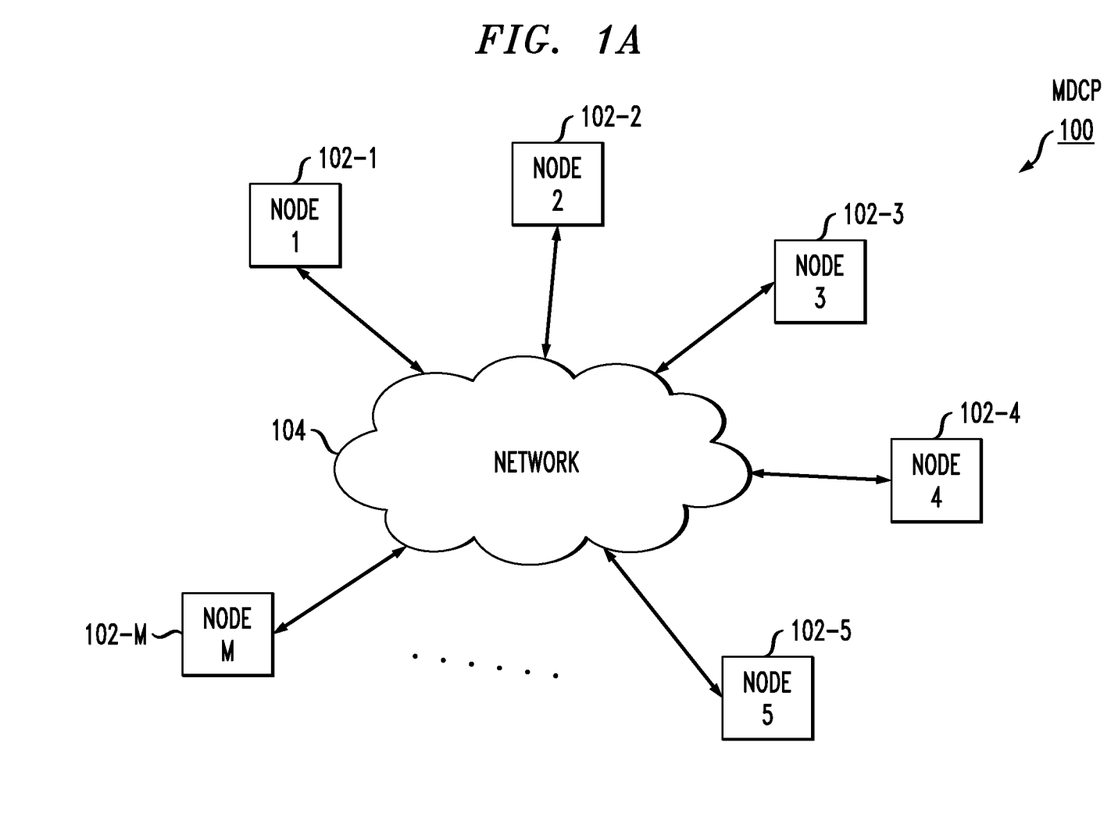
FIG. 1A shows a node cluster associated with a massively distributed computing platform in accordance with which one or more embodiments of the invention are implemented.

FIG. 1A shows a node cluster associated with a massively distributed computing platform in accordance with which one or more embodiments of the invention are implemented. As shown, a massively distributed computing platform (MDCP) 100 comprises a plurality of nodes 102-1, 102-2, 102-3, 102-4, 102-5, . . . , 102-M that are in communication with one another via a network 104. In a big data type data set environment, the MDCP 100 may be implemented in accordance with the big data architecture referred to as the EMC Greenplum™ MPP Database (EMC Corporation, Hopkinton, Mass.). However, embodiments of the invention are not limited to this specific implementation.

Figure 1B:
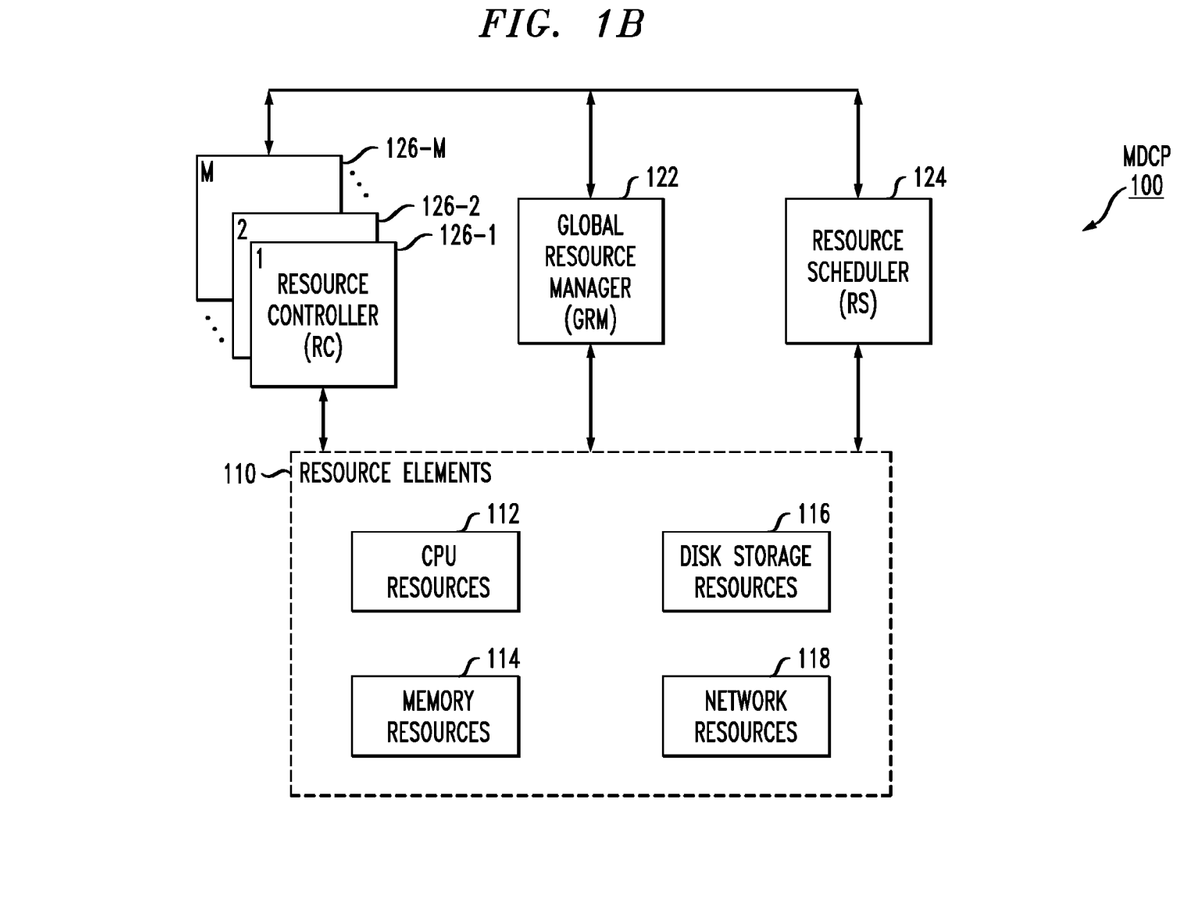
FIG. 1B shows a set of resource elements associated with the massively distributed computing platform of FIG. 1A.

The node cluster (102-1, 102-2, 102-3, 102-4, 102-5, . . . , 102-M) represents a set of resource elements that are collectively utilized (in whole or in part) to execute one or more application programs. One example of an application program is a database application which is responsive to one or more users (which could be, for example, systems, individuals, tasks, jobs, and/or other applications) making queries or other processing requests to the database application. FIG. 1B shows a set of resource elements 110 associated with the MDCP 100 in FIG. 1A. As shown, the set of resource elements 110 comprises CPU resources 112, memory resources 114, disk storage resources 116, and network resources 118. It is to be appreciated that the resources (CPU, memory, disk storage, and network) are provided by some part, or all, of the nodes 102-1, 102-2, 102-3, 102-4, 102-5, . . . , 102-M of the cluster and the network 104, as needed for execution of the application program.

Control, management and scheduling of the resources across the node cluster are implemented by the other components shown in FIG. 1B. For example, a global resource manager 122 is a cluster-specified component that controls the resource allocation for each user. A resource scheduler 124 schedules the allocated resources based on criteria associated with the application program being executed and the availability of nodes. Resource controllers 126-1, 126-2, . . . , 126-M respectively reside on the nodes 102-1, 102-2, 102-3, 102-4, 102-5, . . . , 102-M and, for each node, provide local resource tracking and resource materialization (e.g., provisioning, etc.). Further operations of these components will be explained below in the context of FIGS. 3-5.

Although the components 122 and 124 are shown as separate in FIG. 1B, these components or portions thereof may be implemented at least in part on a common processing platform, e.g., MDCP 100. In other embodiments, components 122 and 124 may each be implemented on a separate processing platform. It is also to be understood that a given embodiment of the MDCP 100 may include multiple instances of the components 122 and 124, although only single instances of such components are shown in the system diagram for clarity and simplicity of illustration.

Figure 2:
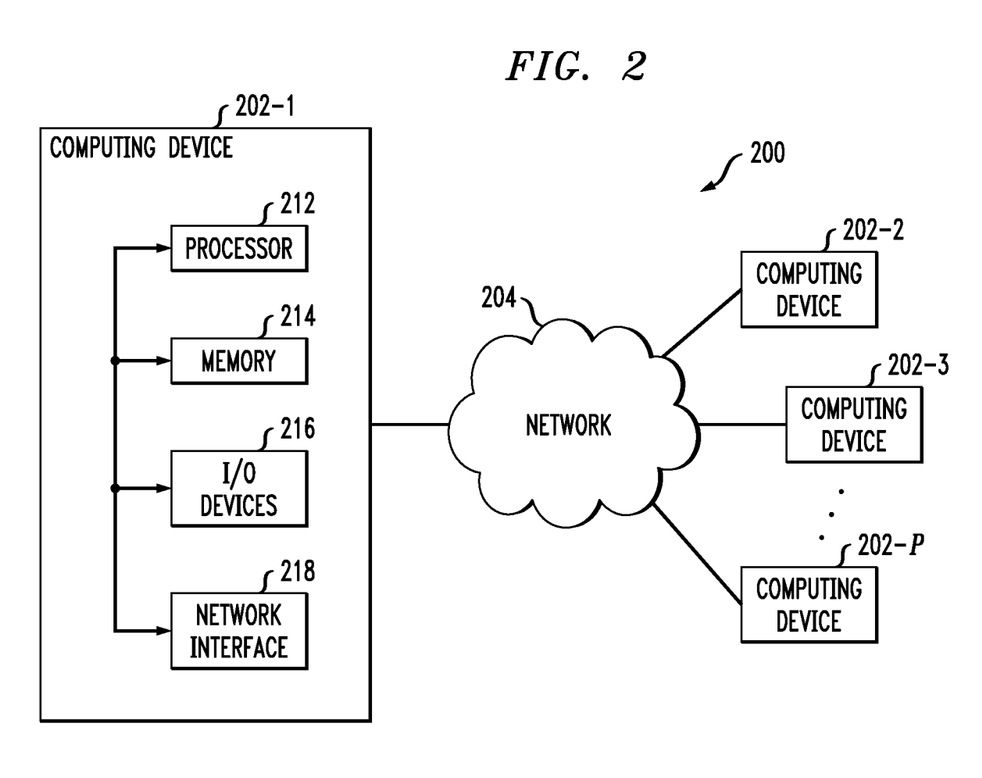
FIG. 2 shows processing infrastructure on which a massively distributed computing platform is implemented in accordance with one embodiment of the invention.

An example of a processing platform on which the MDCP 100 of FIGS. 1A and 1B may be implemented is information processing platform 200 shown in FIG. 2. The processing platform 200 in this embodiment comprises at least a portion of the MDCP 100 and includes a plurality of computing devices, denoted 202-1, 202-2, 202-3, . . . 202-P, which communicate with one another over a network 204. One or more of the elements/components (e.g., cluster nodes, resource controllers, global resource manager, resource scheduler, etc.) of MDCP 100 may therefore each run on a server, computer or other processing platform element, which may be viewed as an example of what is more generally referred to herein as a "processing device." Note that one or more computing devices in FIG. 2 may be servers, while one or more computing devices may be client devices. As illustrated in FIG. 2, such a device generally comprises at least one processor and an associated memory, and implements one or more functional modules for controlling features of MDCP 100. Again, multiple elements or modules may be implemented by a single processing device in a given embodiment.

The computing device 202-1 in the processing platform 200 comprises a processor 212 coupled to a memory 214. The processor 212 may comprise a microprocessor, a microcontroller, an application-specific integrated circuit (ASIC), a field programmable gate array (FPGA) or other type of processing circuitry, as well as portions or combinations of such circuitry elements. The memory 214 may be viewed as an example of what is more generally referred to herein as a "computer program product." A computer program product comprises a processor-readable storage medium (i.e., non-transitory medium) having encoded therein executable code of one or more software programs. Such a memory may comprise electronic memory such as random access memory (RAM), read-only memory (ROM) or other types of memory, in any combination. The computer program code when executed by a processing device such as the computing device 202-1 causes the device to perform functions associated with one or more of the elements/components of MDCP 100. One skilled in the art would be readily able to implement such software given the teachings provided herein. Other examples of computer program products embodying embodiments of the invention may include, for example, optical or magnetic disks.

Computing device 202-1 also includes input/output (I/O) devices 216 which includes, for example, one or more input devices (e.g., keyboard, mouse, etc.) for entering data to the computing device, and one or more output devices (e.g., display, speaker, etc.) for presenting results associated with the computing device. Also included in the computing device 202-1 is network interface circuitry 218, which is used to interface the device with the network 204 and other system components. Such circuitry may comprise conventional transceivers of a type well known in the art.

The other computing devices 202 of the processing platform 200 are assumed to be configured in a manner similar to that shown for computing device 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Furthermore, it is to be appreciated that the processing platform 200 of FIG. 2 can comprise virtual machines (VMs) implemented using a hypervisor. A hypervisor is an example of what is more generally referred to herein as "virtualization infrastructure." The hypervisor runs on physical infrastructure. As such, the computation resource cyclic utilization techniques illustratively described herein can be provided in accordance with one or more cloud services. The cloud services thus run on respective ones of the virtual machines under the control of the hypervisor. Processing platform 200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 200 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX, both commercially available from EMC Corporation of Hopkinton, Mass. A variety of other computing and storage products may be utilized to implement the one or more cloud services that provide the collaborative data visualization functionality and features described herein.

Illustrative details of the MDCP 100 and computation resource cyclic utilization techniques will now be described with reference to FIGS. 3A through 3D.

Embodiments of the invention recognize two important concepts involved in MDCP resource management, i.e., "resource quota" and "resource property." Resource quota indicates the maximum quantity of resources that a user is allowed to reserve, occupy and utilize during (certain phases of) its lifecycle. Here, in this embodiment, a user may be a task, a job or an application. Examples of resource quota include the number of map and reduce slots allocated to a MapReduce job, and the amount of memory allocated to a map task for split reading, map function invocation and partition spilling. Resource property refers to the resource products that are derived from the resources currently being occupied by a user. For example, in a map task of Hadoop, the memory is consumed to construct a JVM (Java VM), a spilling buffer and other data structures, and the disk space is filled with data partition files spilled from the buffer. In this case, the JVM, the spilling buffer and the partition files all belong to the resource property of the map task.

Corresponding to the above two concepts, embodiments of the invention provide two ways of resource inheritance, i.e., resource quota inheritance and resource property inheritance, in order to reduce the latency and improve the performance of application execution. As illustratively used herein, the term "inherit" refers to one user in a plurality of users acquiring usage/access or permission to use/access a given resource to the exclusion of the other users of the plurality of users.

Resource Quota Inheritance

At startup, each resource user first applies for a resource quota assigned by the resource scheduler 124 of the MDCP 100, which is responsible for resource allocation with a given allocation policy. The application and assignment of the resource quota usually involve one or multiple rounds of network communication between the user, the scheduler and possibly other intermediate proxies, due to their distributed locations over the cluster. Depending on the network topology and traffic, the network communication may incur significant overhead, thereby resulting in high latency of application execution. To mitigate this issue, embodiments of the invention provide resource quota inheritance methodologies, where a user is enabled to directly inherit the resource quota from another inactive user or a user in the process of becoming inactive, without interacting with the resource scheduler. It is realized that many users have identical (or similar) resource requirements and/or will be assigned identical (or similar) resource quotas by the resource scheduler. Resource quota inheritance takes places between these users. For example, in a current implementation of Hadoop, the same amount of memory will be allocated to each map/reduce task of a MapReduce job. Advantageously, in accordance with embodiments of the invention, the memory quotas of a wave of map tasks can be inherited by the map tasks of the following wave without affecting the correctness of task execution.

With resource quota inheritance, the network communication invoked for quota application and assignment can be minimized, which in turn brings several potential benefits. First, the startup of a user, i.e., an application, a job or a task, is faster. Second, the network traffic of the cluster is lightened and the possibility of network contention decreases. Third, the burden of the resource scheduler is alleviated, as it now needs to handle fewer resource requests. The latter two benefits are amplified particularly when the number of concurrent resource users is very large. Together and individually, these benefits reduce the latency of application execution.

In accordance with various embodiments, resource quota inheritance can be implemented in a MDCP environment as follows.

As mentioned above and described in the context of FIG. 1B, two kinds of system components exist in an MDCP: a resource scheduler or RS (124) and one or multiple local resource controllers or RCs (126). The resource scheduler is the ultimate authority that arbitrates resources among all the applications in the system and is responsible for assigning resource quotas to resource users. For each resource user, a specific resource controller supervises its resource allocation, usage and release, according to the assigned resource quota. A resource controller may concurrently manage more than one user. Periodically, the resource controller sends the resource utilization information of the users managed by it to the resource scheduler, which may respond with instructions indicating corresponding actions, e.g., revoking all the resources allocated to a specific user, for the resource controller to take.

Figure 3A:
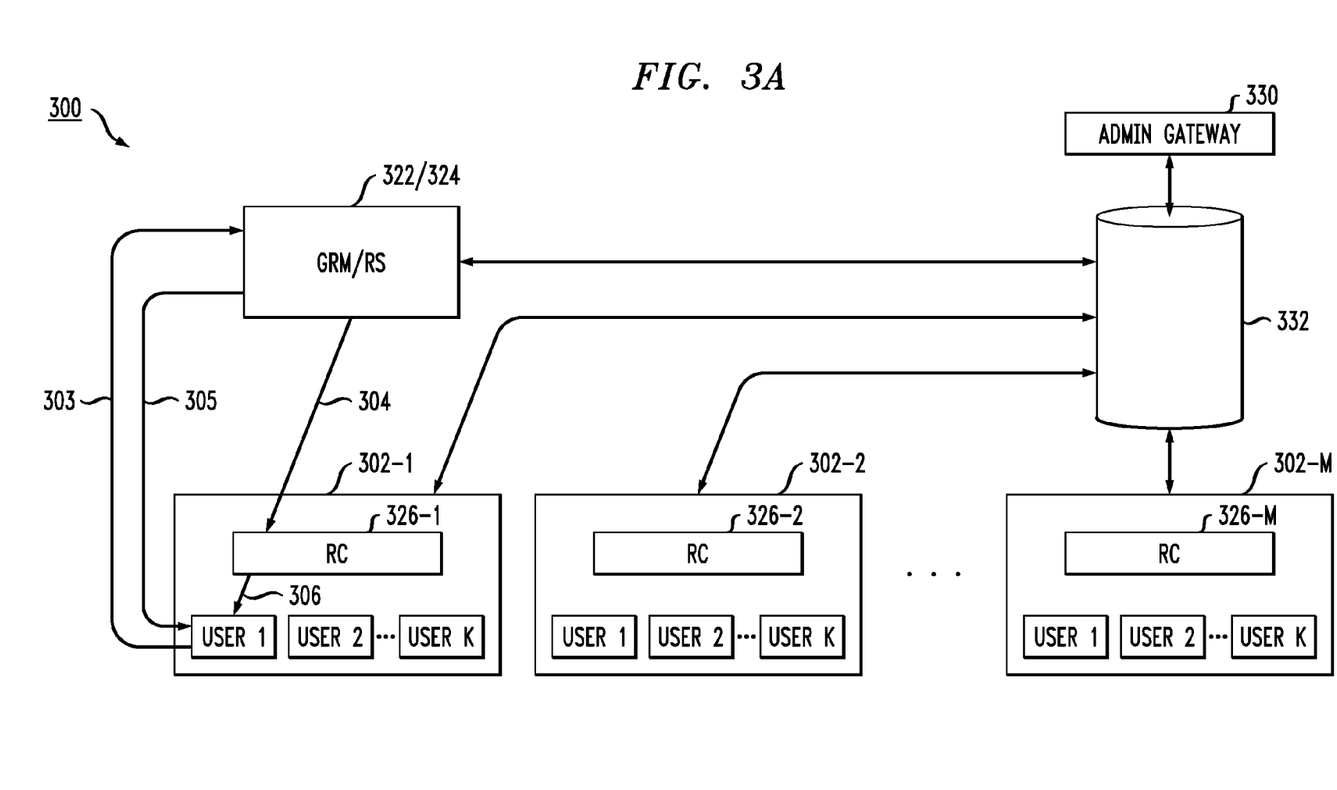
FIG. 3A shows resource quota assignment in accordance with one embodiment of the invention.

FIG. 3A shows resource quota assignment in accordance with one embodiment of the invention. As will be referenced in FIG. 3A, as well as FIGS. 3B through 3D, it is assumed the system (300 in FIG. 3A, 310 in FIG. 3B, 340 in FIG. 3C, and 350 in FIG. 3D) includes a plurality of nodes 302-1, 302-2, . . . , 302-M with respective resource controllers 326-1, 326-2, . . . , 326-M. Each node serves multiple users 1, 2, . . . , K. Also, the system includes a global resource manager 322 and a resource scheduler 324 (which are shown collectively as 322/324 in FIGS. 3A through 3D). Further, the system includes an administrator gateway 330 and meta store 332, as will be further explained below. Note that the global resource manager 322 and the resource scheduler 324 could alternatively be one component which provides the functions of both system elements. Also, some or all of the functions of the resource scheduler could be provided by the global resource manager, and vice versa.

Accordingly, as shown in step 303 of FIG. 3A, a user (e.g., user 1 in node 302-1) sends a resource request to the resource scheduler 324, either directly or via a proxy, e.g. the user's resource controller 326-1. The resource scheduler calculates the resource quota for the user and sends the quota to the user's resource controller in step 304. In step 305, the resource scheduler may acknowledge to the user that its request has been handled. The resource controller 326-1, in step 306, takes charge of the user's resource usage according to its quota.

Figure 3B:
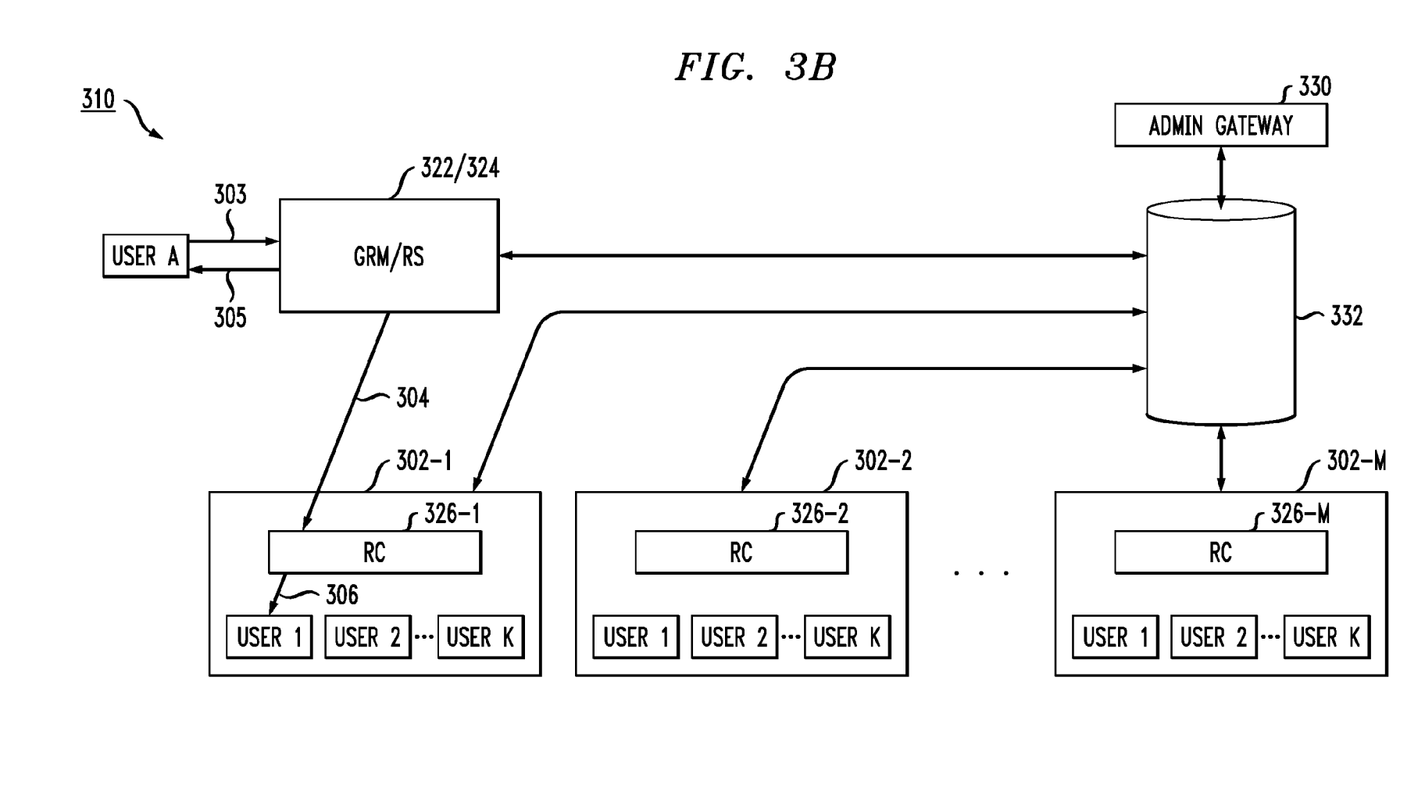
FIG. 3B shows resource quota assignment in accordance with another embodiment of the invention.

The system 310 in FIG. 3B shows the same methodology as in system 300 in FIG. 3A, with the exception that the initial resource request is generated by a user (user A) that is not necessarily controlled by resource controller 326-1. That is, steps 303 through 306 are the same, with the exception that the request is sent from user A (step 303) and the acknowledgment from the resource scheduler goes back to user A (step 305).

In order to realize resource quota inheritance, the resource quotas of inactive users are not immediately returned to the resource scheduler. Instead, in accordance with embodiments of the invention, the resource controllers respectively maintain quota pools 342-1, 342-2, . . . , 342-M, as shown in system 340 in FIG. 3C. Each quota pool temporarily caches the resource quotas of those inactive users that used to be managed by the corresponding resource controller. From the viewpoint of the resource scheduler 324, it appears as if the quotas in the pool were still held by some active users and thus cannot be assigned for incoming new user requests.

Figure 3C:
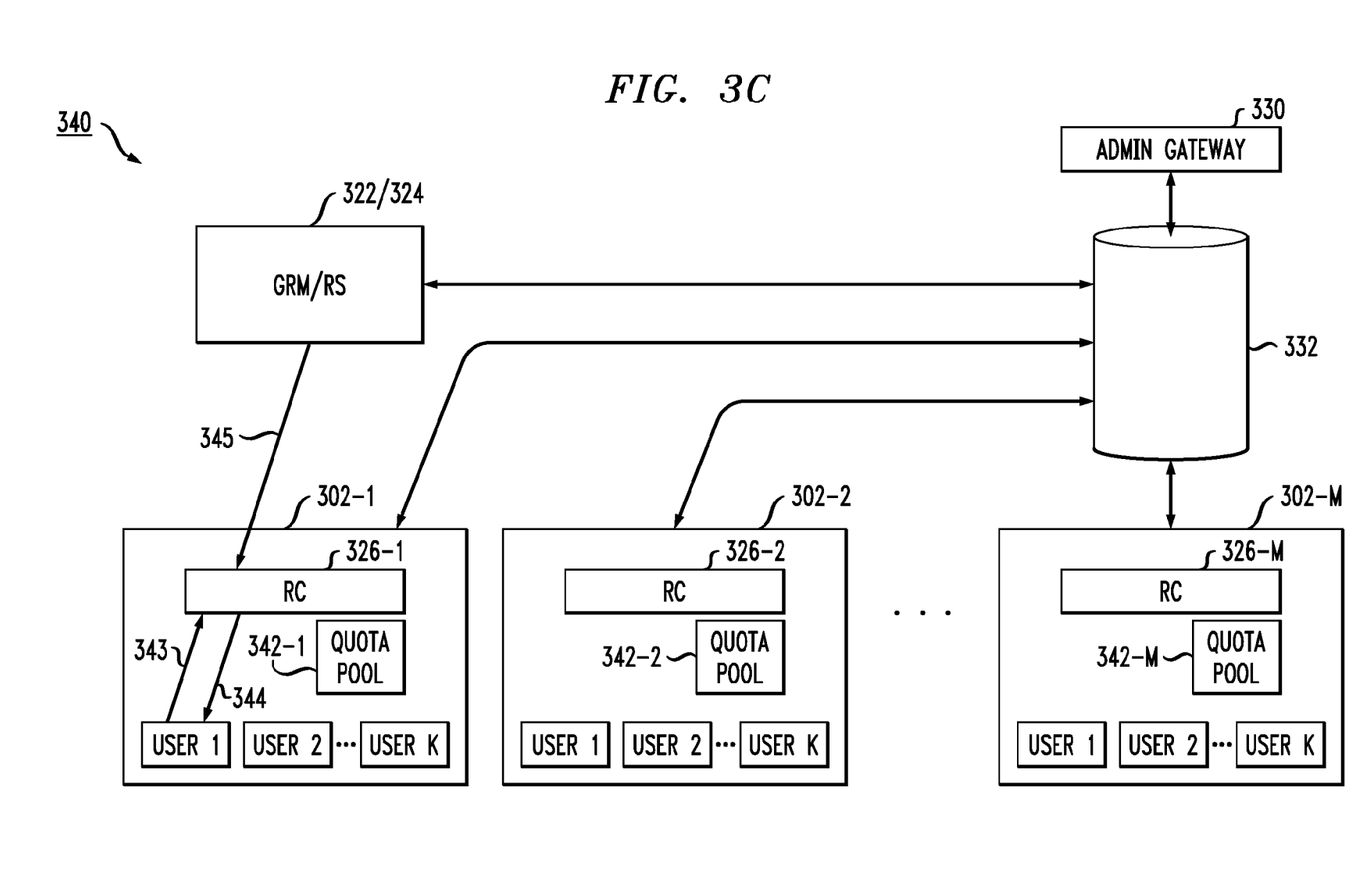
FIG. 3C shows resource quota inheritance in accordance with one embodiment of the invention.

With quota inheritance enabled in this manner, the quota assignment procedure in FIG. 3A or FIG. 3B is refined in the following manner as shown in FIG. 3C. In step 343, the resource request of a user is directly sent to its resource controller, e.g., user 1 to resource controller 326-1. The resource controller 326-1 first searches its quota pool 342-1 for a matching resource quota for the user to inherit. If successful, the resource controller 326-1 assigns the quota to the user, in step 344, and asynchronously informs the resource scheduler 324 about such a quota reallocation. Otherwise, the resource controller 326-1 forwards the original resource request to the resource scheduler 324, which triggers steps 304 through 306 of the quota assignment procedure in FIG. 3A or FIG. 3B (collectively depicted as step 345 in FIG. 3C).

The resource controller knows the resource requirements of the users that it manages, and thus can determine if an existing quota works for a specific user. When there exists more than one matching quota for the user, the resource controller select the optimal one according to some criteria, for example, a cost model which considers factors such as the quota's lifespan and matching degree of resource quantity.

In one embodiment, a resource quota is evicted out of the quota pool under one of two possible situations. First, this quota has been assigned to a new user during step 344. Second, this quota has remained in the quota pool above a certain time threshold and thus is returned to the resource scheduler, so that it can be assigned to users of other resource controllers.

In accordance with embodiments of the invention, resource quota inheritance is managed via an administrator gateway 330. The gateway 330 includes an administrator interface that enables resource quota inheritance to be flexible. In one example, a system administrator specifies different inheritance policies (e.g., rules/parameters) for resource quota inheritance and these policies are stored in a meta store 332, which is accessible by the resource scheduler 324 and the resource controllers 326-1, 326-2, . . . , 326-M. There are a variety of approaches to leverage these policies to enhance the inheritance and guarantee better quality of service (QoS). One approach is to combine user based priority and resource quota inheritance, and consider the work load of the entire node cluster at the same time. Furthermore, the administrator interface of the gateway 330, in one embodiment, is a graphical user interface (GUI) that can be used by a human or, in another embodiment, an application programming interface (API) that can be leveraged by an application program or some other system entity. Some combination of the two types of interfaces may also be employed.

Another benefit of the administrator gateway 330 is to provide detailed information of current/history status of resource inheritance. This information is important to improve the design/tuning of specific user applications. The system administrator can also leverage this information to optimize current inheritance policies. Thus, the behaviors resource quota and/or properties (to be described below) inherent can be modified on the fly (in real time) through the administrator interface according to the current system status, e.g., the status is provided via analysis results obtained by collecting the history/current resource usage of the entire system.

Resource Property Inheritance

Normally, at the end of a user's lifecycle, its resource property will be destroyed and the recycled resources will be put back into the global resource pool managed by the resource scheduler 324. Embodiments of the invention provide for resource property inheritance, where a user is enabled to inherit (a part of) the resource property of another inactive user or user that is becoming inactive. The underlying motivations are two-fold. First, resource products of certain types are actually general-purpose and thus can be directly reused among different users. Examples of such resource products include the workers which do map/reduce tasks and are owned by a MapReduce job, and the JVMs. Second, some resource products may be associated with data that is valuable to other users. For example, it is common that different MapReduce workflows are launched on the same data set and a common MapReduce job exists within multiple workflows (i.e., this job has multiple instances). In this case, as a part of one job instance's resource property, its job output can be inherited and reused by other instances.

With resource property inheritance in accordance with embodiments of the invention, resource products need to be constructed only once and then can be utilized multiple times, which, compared with the conventional situation where an identical or similar resource product will be repeatedly created and destroyed, can lead to significant savings of CPU and I/O costs and thereby lower latency and better performance of application execution. Moreover, resource property inheritance also brings some by-product optimization opportunities. For instance, when JVMs are reused, the JIT (just-in-time) technique can optimize more sections of byte code and thus boost the JVM execution performance to a more notable extent.

Figure 3D:
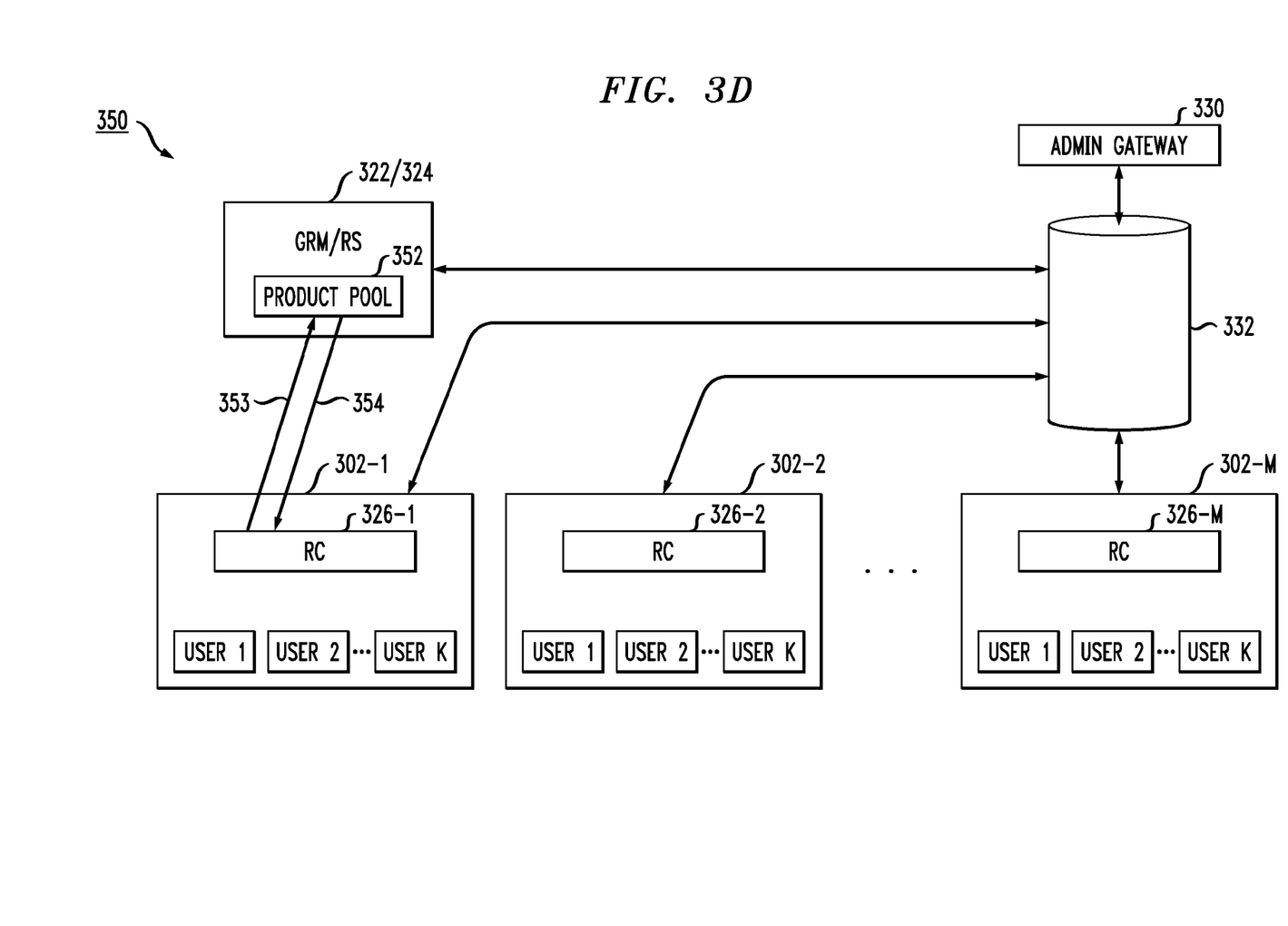
FIG. 3D shows resource property inheritance in accordance with one embodiment of the invention.

As shown in system 350 of FIG. 3D, in order to realize resource property inheritance, the resource scheduler 324 maintain a product pool 352, which records all the resource products that belonged to an inactive user but that have the potential to be inherited. Resource products in the pool will not be immediately destroyed. The resource scheduler 324 decides which resource products to be put into the product pool 352, according to certain criteria. For example, it may be beneficial to reuse a resource product only if this product has more incoming users as well as has a construction cost that is significant compared to the minimum overhead incurred by inheritance. On the other hand, a resource product will be evicted out of the product pool 352 under one of two possible situations. First, this product has been inherited by some new user. Second, this product has remained in the pool above a certain time threshold, and thus should be destroyed to release the occupied resources for better resource utilization efficiency and fairness.

After a user obtains its resource quota and before it starts to utilize granted resources to produce its resource products, the resource controller 326-1 searches, in step 353, the product pool 352 for matching resource products for the user to inherit and reuse. The matching resource products are identified to the resource controller in step 354. Among all the matching products of the same type, the resource controller 326-1 determines the optimal one with a maximum and positive inheritance benefit, i.e., the product construction cost minus the overhead of inheritance (e.g., the network transfer of the product from one node to another). After the above product inheritance phase, the user constructs all the resource products that it still lacks.

It is to be appreciated that the administrator gateway 330 provides administrator interface functions for resource property inheritance in a manner similar to that described above with respect to resource quota inheritance.

In addition to advantages mentioned above, resource quota/property inheritance, according to embodiments of the invention, are generally applicable to various types of computing platforms, not just MDCP. The resource quota/property inheritance concepts can be instantiated in a wide range of platform-specific optimization techniques such as, but not limited to, the container reuse and YarnChild pool in Hadoop 0.23.1. Also, the granularity of the implementation of the resource quota/property inheritance concepts is controllable. Each concept can be applied independently of the other, and the granularity of resource quota/property inheritance is also tunable.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising steps of:
    sending a resource request from a user to a resource controller, wherein the resource controller is resident on a node of a distributed computing platform comprising a plurality of nodes configured to collectively execute at least one application program;
    searching a quota pool associated with the resource controller for a matching resource quota for the user to inherit, wherein the quota pool comprises resource quotas assigned to one or more users and wherein the search for a matching resource quota is performed among resource quotas of the one or more users that are inactive or becoming inactive;
    assigning the resource quota to the user when a matching resource quota for the user to inherit is found in the quota pool;
    forwarding the resource request to a resource scheduler that globally manages resources for the distributed computing platform, when a matching resource quota for the user to inherit is not found in the quota pool;
    receiving, at the resource controller, a resource quota calculated by the resource scheduler in response to the forwarded resource request, and assigning the resource quota to the user; and
    evicting a resource quota from the quota pool when the resource quota is in the quota pool at or beyond a given time threshold;
    wherein the steps are performed via a processing device.

2. The method of claim 1, further comprising the resource controller managing a resource usage by the user according to the assigned resource quota.

3. The method of claim 1, further comprising the quota pool temporarily maintaining resource quotas of inactive users previously managed by the resource controller.

4. The method of claim 3, further comprising evicting a resource quota from the quota pool when the resource quota is assigned to another user.

5. The method of claim 1, further comprising maintaining an interface for adjusting at least one policy associated with inheritance of a resource quota.

6. The method of claim 5, further comprising maintaining at least one of a current status and a historical status associated with inheritance of a resource quota.

7. The method of claim 1, wherein the distributed computing platform is a massively distributed computing platform.

8. The method of claim 1, wherein resources associated with the plurality of nodes configured to collectively execute the at least one application program comprise one or more of processing resources, memory resources, storage resources, and network resources.

9. A computer program product comprising a processor-readable storage medium having encoded therein executable code of one or more software programs, wherein the one or more software programs when executed by the processing device implement the steps of the method of claim 1.

10. An apparatus comprising a memory and a processor operatively coupled to the memory, the processor and the memory forming the processor device, wherein the processor and the memory are configured to implement the steps of:
    sending a resource request from a user to a resource controller, wherein the resource controller is resident on a node of a distributed computing platform comprising a plurality of nodes configured to collectively execute at least one application program;
    searching a quota pool associated with the resource controller for a matching resource quota for the user to inherit, wherein the quota pool comprises resource quotas assigned to one or more users and wherein the search for a matching resource quota is performed among resource quotas of the one or more users that are inactive or becoming inactive;
    assigning the resource quota to the user when a matching resource quota for the user to inherit is found in the quota pool;
    forwarding the resource request to a resource scheduler that globally manages resources for the distributed computing platform, when a matching resource quota for the user to inherit is not found in the quota pool;

receiving, at the resource controller, a resource quota calculated by the resource scheduler in response to the forwarded resource request, and assigning the resource quota to the user; and evicting a resource quota from the quota pool when the resource quota is in the quota pool at or beyond a given time threshold.

11. A method comprising steps of:

maintaining a resource product pool at a resource scheduler, wherein the resource scheduler is part of a distributed computing platform comprising a plurality of nodes configured to collectively execute at least one application program and the resource scheduler globally manages resources for the distributed computing platform, the resource product pool recording resource products belonging to inactive users that can be inherited;

receiving a resource product request at the resource scheduler from a resource controller, wherein the resource controller is resident on a node of one of the plurality of nodes, and wherein the resource product request is sent by the resource controller after a user associated therewith obtains a resource quota but before the user utilizes a given resource to produce a resource product;

searching the resource product pool for a matching resource product for the user to inherit and reuse, wherein the resource product pool comprises resource products assigned to one or more users and wherein the search for a matching resource product is performed among resource products of the one or more users that are inactive or becoming inactive;

assigning the resource product to the user when a matching resource product for the user to inherit and reuse is found in the resource product pool; and evicting a resource product from the resource product pool when the resource product is in the resource product pool at or beyond a given time threshold;

wherein the steps are performed via a processing device.

12. The method of claim 11, further comprising determining a cost difference between inheriting a given resource product and producing the given resource product.

13. The method of claim 11, further comprising evicting a resource product from the resource product pool when the resource product is inherited by another user.

14. The method of claim 11, further comprising maintaining an interface for adjusting at least one policy associated with inheritance of a resource product.

15. The method of claim 14, further comprising maintaining at least one of a current status and a historical status associated with inheritance of a resource quota.

16. The method of claim 11, wherein the distributed computing platform is a massively distributed computing platform.

17. A computer program product comprising a processor-readable storage medium having encoded therein executable code of one or more software programs, wherein the one or more software programs when executed by the processing device implement the steps of the method of claim 11.

18. An apparatus comprising a memory and a processor operatively coupled to the memory, the processor and the memory forming the processor device, wherein the processor and the memory are configured to implement the steps of the method of claim 11.

* * * * *